US010124651B2

(12) United States Patent
Blatchley et al.

(10) Patent No.: US 10,124,651 B2
(45) Date of Patent: Nov. 13, 2018

(54) SYSTEMS AND METHODS FOR CONTROLLING ELECTRICALLY POWERED HEATING DEVICES WITHIN ELECTRIFIED VEHICLES

(71) Applicant: FORD GLOBAL TECHNOLOGIES, LLC, Dearborn, MI (US)

(72) Inventors: Timothy Noah Blatchley, Dearborn, MI (US); Angel Fernando Porras, Dearborn, MI (US); William Samuel Schwartz, Pleasant Ridge, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/415,015

(22) Filed: Jan. 25, 2017

(65) Prior Publication Data
US 2018/0208018 A1 Jul. 26, 2018

(51) Int. Cl.
| | | |
|---|---|---|
| *B60H 1/03* | (2006.01) | |
| *B60H 1/32* | (2006.01) | |
| *B60H 1/00* | (2006.01) | |
| *B60H 1/22* | (2006.01) | |

(52) U.S. Cl.
CPC ......... *B60H 1/034* (2013.01); *B60H 1/00385* (2013.01); *B60H 1/2218* (2013.01); *B60H 1/2225* (2013.01); *B60H 1/3204* (2013.01); *B60H 2001/224* (2013.01); *B60H 2001/2253* (2013.01)

(58) Field of Classification Search
CPC .... B60H 1/00878; B60H 1/04; H05B 1/0236; G05B 15/02; G05D 23/19; B60L 11/1851
See application file for complete search history.

(56) References Cited

U.S. PATENT DOCUMENTS

| | | | |
|---|---|---|---|
| 6,040,561 | A | 3/2000 | Murty |
| 8,191,662 | B2 | 6/2012 | Sauvlet et al. |
| 8,362,398 | B2 | 1/2013 | Heiden et al. |
| 8,453,722 | B2 | 6/2013 | Zeigler et al. |
| 9,067,475 | B1 | 6/2015 | Jeong |
| 9,869,982 | B1* | 1/2018 | Clidaras ................ G05B 15/02 |
| 2015/0034626 | A1* | 2/2015 | Kominami .......... H05B 1/0236 219/483 |
| 2015/0158367 | A1* | 6/2015 | Jeong ................. B60H 1/00878 701/36 |
| 2015/0183296 | A1 | 7/2015 | Ragazzi |
| 2016/0200172 | A1* | 7/2016 | Nakashima .......... H05B 1/0236 237/5 |

FOREIGN PATENT DOCUMENTS

FR    3029847    6/2016

* cited by examiner

*Primary Examiner* — Yonel Beaulieu
*Assistant Examiner* — Martin A Weeks
(74) *Attorney, Agent, or Firm* — Carlson, Gaskey & Olds

(57) ABSTRACT

An electrified vehicle includes a passenger cabin, an electrically powered heating device configured to heat airflow for conditioning the passenger cabin, and a controller configured to selectively command actuation of the electrically powered heating device based on a target discharge air temperature, an actual discharge air temperature, and an amount of power available.

19 Claims, 3 Drawing Sheets

SYSTEMS AND METHODS FOR CONTROLLING ELECTRICALLY POWERED HEATING DEVICES WITHIN ELECTRIFIED VEHICLES

TECHNICAL FIELD

This disclosure relates to a vehicle system and method associated with an electrified vehicle. An exemplary vehicle system includes an electrically powered heating device that may be controlled for delivering conditioned airflow to a vehicle passenger cabin. The electrically powered heating device may be controlled based on at least a target discharge air temperature, an actual discharge air temperature, and an amount of power available.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified vehicles often present unique thermal management challenges. For example, achieving desired passenger cabin comfort levels within the electrified vehicle must be balanced against maximizing the fuel economy and electric range of the electrified vehicle.

SUMMARY

An electrified vehicle according to an exemplary aspect of the present disclosure includes, among other things, a passenger cabin, an electrically powered heating device configured to heat airflow for conditioning the passenger cabin, and a controller configured to selectively command actuation of the electrically powered heating device based on a target discharge air temperature, an actual discharge air temperature, and an amount of power available.

In a further non-limiting embodiment of the foregoing electrified vehicle, the electrically powered heating device is located downstream from an evaporator and a heater core of a heating, ventilation, and air conditioning (HVAC) system.

In a further non-limiting embodiment of either of the foregoing electrified vehicles, the electrically powered heating device includes a positive temperature coefficient (PTC) heater.

In a further non-limiting embodiment of any of the foregoing electrified vehicles, the electrically powered heating device includes a plurality of PTC heaters mounted at various locations of a casing of a heating, ventilation, and air conditioning (HVAC) system.

In a further non-limiting embodiment of any of the foregoing electrified vehicles, the electrically powered heating device includes a resistive heating device.

In a further non-limiting embodiment of any of the foregoing electrified vehicles, a heater core is mounted within a casing of an HVAC system.

In a further non-limiting embodiment of any of the foregoing electrified vehicles, the controller is configured to offset a load of the heater core based on a heating capability of the electrically powered heating device.

In a further non-limiting embodiment of any of the foregoing electrified vehicles, the controller is configured to power the electrically powered heating device using the amount of power available or an amount of power necessary to achieve the target discharge air temperature, whichever is lower.

In a further non-limiting embodiment of any of the foregoing electrified vehicles, the electrically powered heating device is a high voltage device powered by a battery pack.

In a further non-limiting embodiment of any of the foregoing electrified vehicles, the electrically powered heating device is a low voltage device powered by a DC/DC converter.

A method according to another exemplary aspect of the present disclosure includes, among other things, heating airflow to a first level with an engine of an electrified vehicle, heating the airflow to a second level using an electrically powered heating device that is controlled based on a target discharge air temperature, an actual discharge air temperature, and an amount of power available, and conditioning a passenger cabin of the electrified vehicle using the airflow heated by the engine and the electrically powered heating device.

In a further non-limiting embodiment of the foregoing method, the method includes powering the electrically powered heating device with a battery pack of the electrified vehicle.

In a further non-limiting embodiment of either of the foregoing methods, the method includes powering the electrically powered heating device with a DC/DC converter of the electrified vehicle.

In a further non-limiting embodiment of any of the foregoing methods, the method includes powering the electrically powered heating device using the amount of power available or an amount of power necessary to achieve the target discharge air temperature, whichever is lower.

In a further non-limiting embodiment of any of the foregoing methods, the method includes deriving a gap-to-target temperature value from the difference between the target discharge air temperature and the actual discharge air temperature and deriving an amount of power necessary to achieve the target discharge air temperature from the gap-to-target temperature value.

In a further non-limiting embodiment of any of the foregoing methods, the method includes powering the electrically powered heating device using the amount of power available or the amount of power necessary to achieve the target discharge air temperature, whichever is lower.

In a further non-limiting embodiment of any of the foregoing methods, the method includes running the electrically powered heating device during a warm-up period of the engine to increase a load on the engine during the warm-up period, accelerate warm-up of the engine, and increase efficiency of the engine.

In a further non-limiting embodiment of any of the foregoing methods, the method includes reducing a target engine coolant temperature by employing a heater core coolant temperature target offset to reduce coolant heating requirements on the engine and reduce operation of the engine required to heat the coolant.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for controlling an electrically powered heating device to deliver conditioned airflow to a vehicle passenger cabin. The electrically powered heating device may be actuated to condition airflow for delivery to the vehicle passenger cabin if certain vehicle conditions have been met. In some embodiments, for example, the electrically powered heating device is controlled to compensate for reduced heat generated by an engine of the electrified vehicle. These and other features are described in greater detail in the following paragraphs of this detailed description.

Figure 1:
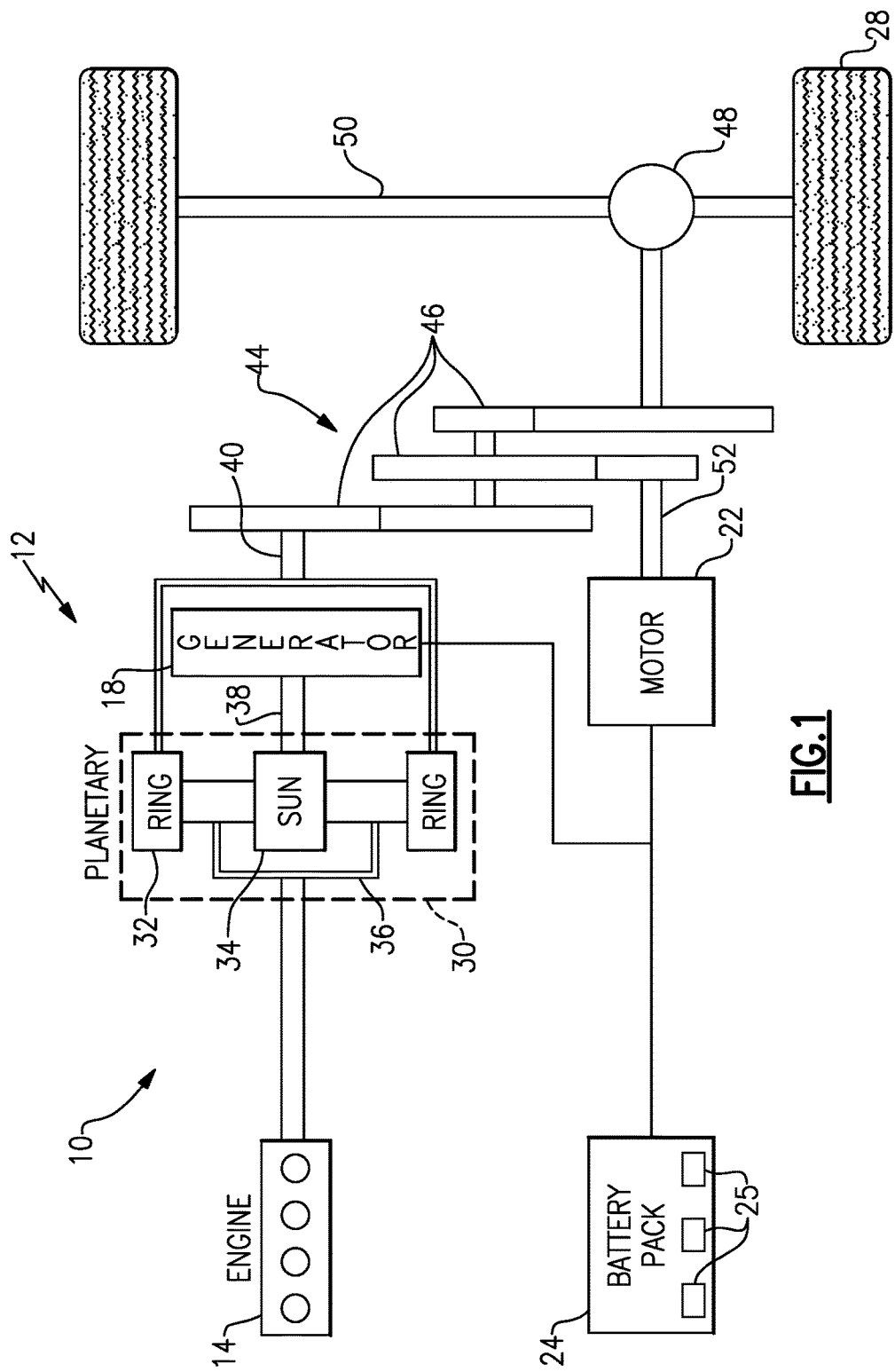
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

In order to improve the fuel economy and overall efficiency of the electrified vehicle 12, the size of the engine 14 may be reduced and operated at higher efficiencies, thereby potentially degrading vehicle warm up capabilities. Systems and methods for actively compensating for this reduced heat generation from the engine 14 are therefore detailed below.

Figure 2:
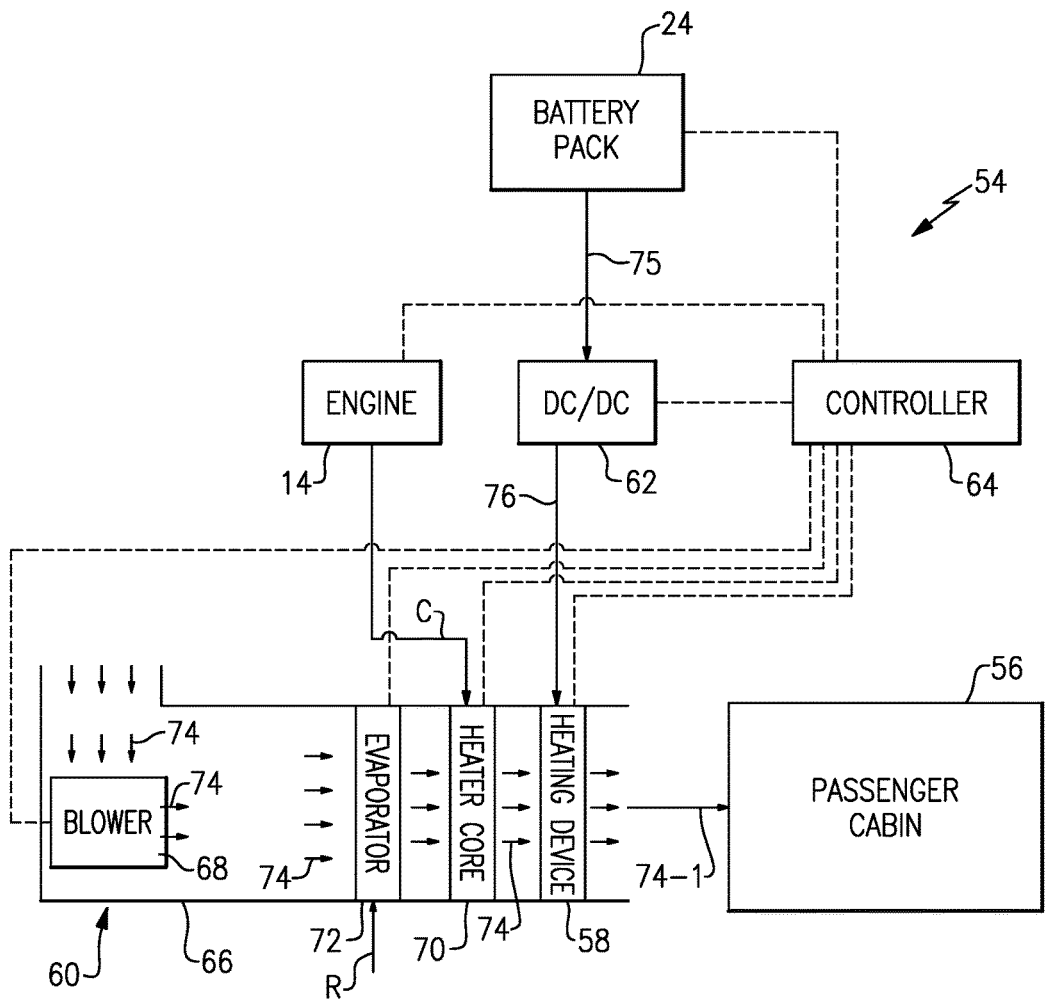
FIG. 2 illustrates a vehicle system of an electrified vehicle.

FIG. 2 is a highly schematic depiction of a vehicle system 54 that may be employed within an electrified vehicle, such as the electrified vehicle 12 of FIG. 1. The various components of the vehicle system 54 are shown schematically to better illustrate the features of this disclosure. These components, however, are not necessarily depicted in the exact locations where they would be found in an actual vehicle and are not necessarily shown to scale.

The vehicle system 54 is adapted to deliver conditioned airflow 74-1 at a desired temperature to a passenger cabin 56 of the electrified vehicle 12. In a non-limiting embodiment, an electrically powered heating device 58 is controlled to augment the temperature of the conditioned airflow 74-1 delivered to the passenger cabin 56 by the heater core 70 which transfers heat from the engine 14 via engine coolant C circulating between the engine 14 and the heater core 70. Further conditioning the airflow using the electrically powered heating device 58 during certain vehicle conditions may improve fuel efficiency and passenger cabin warm up times, among other potential benefits.

The exemplary vehicle system 54 may include a heating, ventilation, and air conditioning (HVAC) system 60, the engine 14, one or more electrically powered heating devices 58, a DC/DC converter 62, the battery pack 24, and a controller 64. As detailed below, both the engine 14 and the electrically powered heating device 58 are available heat sources for delivering conditioned airflow 74-1 to the passenger cabin 56.

The HVAC system 60 is equipped to modify a temperature inside the passenger cabin 56. In a non-limiting embodiment, the HVAC system 60 includes an HVAC casing 66 and a blower 68, a heater core 70, and an evaporator 72 housed inside the HVAC casing 66. The blower 68 may be controlled to cause airflow 74 to flow through the HVAC casing 66 and into the passenger cabin 56. In a non-limiting embodiment, the blower 68 is a variable speed blower for forcing the airflow 74 through the HVAC casing 66, through the various heating and cooling elements, and then into the passenger cabin 56.

If heating is demanded within the passenger cabin 56 (e.g. by a driver/operator/passenger), coolant C heated by the engine 14 flows to the heater core 70 for exchanging heat with airflow 74 that is blown across the heater core 70 by the blower 68. The airflow 74 may enter the HVAC casing 66 from outside the vehicle, for example. The relatively warm coolant C from the engine 14 loses its heat to the airflow 74 within the heater core 70, and the conditioned airflow 74-1 then flows into the passenger cabin 56, thereby heating it.

Alternatively, if cooling is demanded within the passenger cabin 56, refrigerant R may flow to the evaporator 72. The refrigerant R substantially changes phase from liquid to vapor in the evaporator 72 and absorbs heat from airflow 74 that is blown across the evaporator 72 by the blower 68. Conditioned airflow 74-1 then flows into the passenger cabin 56, thereby cooling it.

In a non-limiting embodiment, the airflow 74 heated by the heater core 70 may be heated an additional amount by actuating the electrically powered heating device 58. In a first non-limiting embodiment, the electrically powered heating device 58 is a positive temperature coefficient (PTC) heater. In a second non-limiting embodiment, the electrically powered heating device 58 is a resistive heating device. The electrically powered heating device 58 could also be either a low voltage device or a high voltage device and may be selected such that its maximum regulating temperature is within the optimal comfort level temperature range of the passenger cabin 56. Although a single heating device 58 is shown in FIG. 2, it should be understood that the vehicle system 54 could include one or more electrically powered heating devices 58.

The electrically powered heating device 58 could be mounted at various locations inside the HVAC casing 66. For example, in a non-limiting embodiment, the electrically powered heating device 58 is positioned between the evaporator 72 and the heater core 70 of the HVAC system 60. Other mounting locations are also contemplated within the scope of this disclosure.

In a first non-limiting embodiment, a first DC output 75 from the battery pack 24 may be used to power the electrically powered heating device 58, such as when the electrically powered heating device 58 is a high voltage device. In a second non-limiting embodiment, a second DC output from the DC/DC converter 62 is used to power the electrically powered heating device 58, such as when the electrically powered heating device 58 is a low voltage device. For example, the first DC output 75 from the battery pack 24 may be received by the DC/DC converter 62. The DC/DC converter 62 may be configured as a step down converter that changes the first DC output 75 from the battery pack 24 from one voltage level to another, lower voltage level. The second DC output 76 from the DC/DC converter 62 is then used to power the electrically powered heating device 58.

The controller 64 is configured to control operation of the vehicle system 54. The controller 64 could be part of an overall vehicle control module, such as a vehicle system controller (VSC), or could alternatively be a stand-alone controller separate from the VSC. In a non-limiting embodiment, the controller 64 utilizes a proportional integral control strategy.

The controller 64 may be programmed with executable instructions for interfacing with and operating the various components of the vehicle system 54. The controller 64 includes various inputs and outputs for interfacing with the components of the vehicle system 54, including but not limited to, the HVAC system 60, the engine 14, the battery pack 24, the DC/DC converter 62, and the electrically powered heating device 58. The controller 64 additionally includes a processing unit and non-transitory memory for executing the various control strategies and modes of the vehicle system 54.

In a non-limiting embodiment, the controller 64 controls the HVAC system 60 and the electrically powered heating device 58 to heat the passenger cabin 56 to a desired comfort level. For example, when heating is requested inside the passenger cabin 56, the engine 14 provides the heat necessary (e.g., via the coolant C) to heat the airflow 74 up to a first level or amount. The controller 64 may selectively activate the electrically powered heating device 58 to augment heating the airflow 74 up to a second level or amount.

The controller 64 may command the electrically powered heating device 58 ON when certain vehicle conditions have been met. In a non-limiting embodiment, the electrically powered heating device 58 is controlled based on a target discharge air temperature, an actual discharge air temperature, and the amount of power available for powering the electrically powered heating device 58. The controller 64 may also be configured to determine when to start and stop conditioning the airflow 74 via the electrically powered heating device 58.

Figure 3:
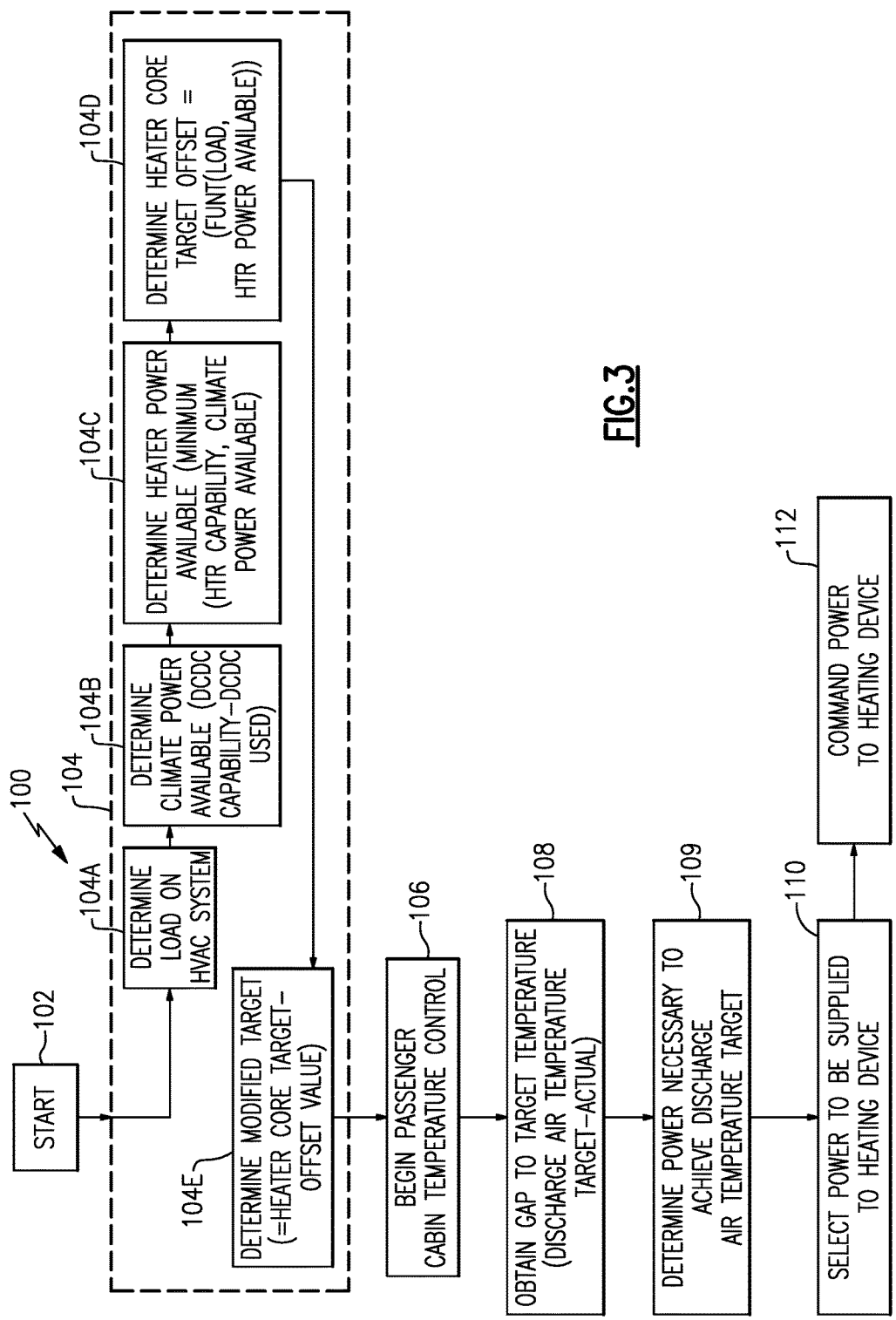
FIG. 3 illustrates an exemplary control strategy for controlling an electrically powered heating device of an electrified vehicle.

FIG. 3, with continued reference to FIGS. 1-2, schematically illustrates a control strategy 100 for controlling the vehicle system 54. For example, the control strategy 100 can be performed to augment heating of the airflow 74 delivered to the passenger cabin 56 by activating the electrically powered heating device 58 if certain conditions have been met. The controller 64 can be programmed with one or more algorithms adapted to execute the control strategy 100 or any other control strategy. In a non-limiting embodiment, the control strategy 100 is stored as executable instructions in the non-transitory memory of the controller 64.

The control strategy 100 begins at block 102. The control strategy 100 may undergo a series of calculations for determining the amount of power that is available for powering the electrically powered heating device 58, as shown schematically at block 104. First, as shown at block 104A, the control strategy 100 determines a load on the HVAC system 60. The load on the HVAC system 60 may be based on an intake temperature of the airflow 74 and a flow rate of the blower 68, in a non-limiting embodiment. In another non-limiting embodiment, the load of the HVAC system 60 is determined by referencing a look-up table stored in the memory of the controller 64.

Next, at block 104B, the control strategy 100 determines the climate power available. The climate power available may be obtained by subtracting the DC/DC power used from the DC/DC power available. The DC/DC power used is the load currently on the DC/DC converter 62 that is not currently being used to power the electrically powered heating device 58.

The amount of power available for powering the electrically powered heating device 58 is determined at block 104C. The amount of power available is obtained by selecting the minimum of the heater capability of the electrically powered heating device 58 and the climate power available (obtained at block 104B).

The heating load on the heater core 70 can be reduced based on the amount of heat that can be supplied by the electrically powered heating device 58. In this regard, at block 104D, the control strategy 100 determines a heater core coolant temperature target offset. The heater core coolant temperature target offset is a reduction in coolant temperature target provided to the heater core 70 by the engine 14. By reducing the coolant temperature needed by the heater core 70 via this offset, the heating load on the heater core 70 is reduced. This calculation may be determined as a function of the load on the HVAC system 60 (obtained at block 104A) and the heater power available (obtained at block 104C). Next, at block 104E, a modified heater core coolant temperature target is determined by subtracting the heat core coolant temperature target offset (obtained at block 104D) from the heater core coolant temperature target.

Temperature control of the passenger cabin 56 begins at block 106. Next, at block 108, the control strategy 100 determines a gap-to-target temperature value. The gap-to-target temperature value is obtained by subtracting an actual discharge air temperature from a target discharge air temperature. The actual discharge air temperature is the temperature of the conditioned airflow 74-1 being delivered into the passenger cabin 56, which may be sensed using various sensors or may be inferred based on various parameters including but not limited to ambient temperatures, heater core performance, HVAC system performance, engine coolant temperatures, etc. The target discharge air temperature is the temperature of the conditioned airflow 74-1 that is necessary to heat the passenger cabin 56 to a desired comfort level. This value may be a predefined value selected from a look-up table stored in the memory of the controller 64 and may be based on a variety of factors including but not limited to the selected HVAC mode, ambient temperatures, etc.

At block 109, the control strategy 100 may determine the amount of power necessary to achieve the discharge air temperature target. This determination may be based on the gap-to-target temperature value previously obtained at block 108.

Next, at block 110, the control strategy 100 selects that amount of DC power that will be supplied for powering the electrically powered heating device 58. In a non-limiting embodiment, the amount of power supplied is the lower of the power necessary to achieve the discharge air temperature (obtained at block 109) and the amount of heater power available (obtained at block 104C). Finally, at block 112, the electrically powered heating device 58 is powered using the amount of power determined at block 110.

In cold engine start conditions, HEV's, such as the electrified vehicle 12, must generally warm up the engine 14 to a target temperature in order to provide adequate heat to the passenger cabin 56 via the heater core 70 through which engine heated coolant C flows. Once the engine target temperature is reached, the engine 14 can be shut down and the electrified vehicle 12 can run on electric propulsion for a time until the engine 14 temperature falls to a value deemed too cold for adequate passenger cabin 56 heating, upon which the engine 14 is restarted. Getting to the state where the engine 14 can be shut down because it is warm enough for passenger cabin 56 heating purposes is desirable from a vehicular fuel economy standpoint. Prior to this state, when the engine 14 is not warm enough for cabin heating purposes, operation of the engine 14 to warm it up may not align with vehicle propulsion needs, thereby driving operation of the engine 14 solely for the purposes of providing heat to the passenger cabin 56. Engine 14 operation in this mode of running solely for cabin heating purposes is generally at low load and therefore inefficient. It is therefore desirable to both exit this warm-up mode as quickly as possible and to increase engine efficiency in this mode, and in general.

The systems and methods of this disclosure accomplish both of these objectives in addition to providing enhanced passenger cabin 56 heating performance. The time required to obtain a target engine coolant temperature deemed acceptable for passenger cabin 56 heating, and at which the engine 14 can be shut down, is decreased in two ways. First, by reducing the temperature target via the heater core coolant temperature target offset method described above, the target engine coolant temperature is correspondingly reduced. This reduces warm-up time by providing a lower warm-up temperature target. Second, by running the electrically powered heating device 58 during the warm-up period, the load on the engine 14 is increased, thereby increasing engine 14 work output and heat generation as well as engine efficiency. The increased heat generation serves to warm-up the engine 14 more quickly. The load on the engine 14 is increased but the engine runs more efficiently and runs less, thereby resulting in a net fuel economy benefit even though the engine 14 is working harder when it is on. Additionally, by operating the electrically powered heating device 58, the level of cabin heat can be increased over systems without the device, thereby providing improved passenger cabin heating performance through increased heat delivery to the passenger cabin 56. The fuel economy, and passenger cabin warm-up times, and overall cabin heating performance of the electrified vehicle 12 are therefore improved by the proposed systems and methods of this disclosure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising: a passenger cabin; an electrically powered heater configured to heat airflow for conditioning said passenger cabin; and
a controller configured to selectively command actuation of said electrically powered heater based on a target discharge air temperature, an actual discharge air temperature, and an amount of power available.

2. The electrified vehicle as recited in claim 1, wherein said electrically powered heater is located downstream from an evaporator and a heater core of a heating, ventilation, and air conditioning (HVAC) system.

3. The electrified vehicle as recited in claim 1, wherein said electrically powered heater includes a positive temperature coefficient (PTC) heater.

4. The electrified vehicle as recited in claim 3, wherein said electrically powered heater includes a plurality of PTC heaters mounted at various locations of a casing of a heating, ventilation, and air conditioning (HVAC) system.

5. The electrified vehicle as recited in claim 1, wherein said electrically powered heater includes a resistive heating device.

6. The electrified vehicle as recited in claim 1, comprising a heater core mounted within a casing of an HVAC system.

7. The electrified vehicle as recited in claim 6, wherein said controller is configured to reduce a load of said heater core based on a heating capability of said electrically powered heater.

8. An electrified vehicle, comprising:
a passenger cabin;
an electrically powered heater configured to heat airflow for conditioning said passenger cabin; and
a controller configured to selectively command actuation of said electrically powered heating device based on a target discharge air temperature, an actual discharge air temperature, and an amount of power available,
wherein said controller is configured to power said electrically powered heater using the amount of power available or an amount of power necessary to achieve the target discharge air temperature, whichever is lower.

9. The electrified vehicle as recited in claim 1, wherein said electrically powered heater is a high voltage device powered by a battery pack.

10. The electrified vehicle as recited in claim 1, wherein said electrically powered is a low voltage device powered by a DC/DC converter.

11. A method, comprising:
heating airflow to a first level with an engine of an electrified vehicle;
heating the airflow to a second level using an electrically powered heating device that is controlled based on a target discharge air temperature, an actual discharge air temperature, and an amount of power available; and
conditioning a passenger cabin of the electrified vehicle using the airflow heated by the engine and the electrically powered heating device.

12. The method as recited in claim 11, comprising powering the electrically powered heating device with a battery pack of the electrified vehicle.

13. The method as recited in claim 11, comprising powering the electrically powered heating device with a DC/DC converter of the electrified vehicle.

14. The method as recited in claim 11, comprising powering the electrically powered heating device using the amount of power available or an amount of power necessary to achieve the target discharge air temperature, whichever is lower.

15. A method, comprising:
heating airflow to a first level with an engine of an electrified vehicle;
heating the airflow to a second level using an electrically powered heating device that is controlled based on a target discharge air temperature, an actual discharge air temperature, and an amount of power available;
conditioning a passenger cabin of the electrified vehicle using the airflow heated by the engine and the electrically powered heating device;
deriving a gap-to-target temperature value from the difference between the target discharge air temperature and the actual discharge air temperature; and
deriving an amount of power necessary to achieve the target discharge air temperature from the gap-to-target temperature value.

16. The method as recited in claim 15, comprising powering the electrically powered heating device using the amount of power available or the amount of power necessary to achieve the target discharge air temperature, whichever is lower.

17. A method, comprising:
heating airflow to a first level with an engine of an electrified vehicle;
heating the airflow to a second level using an electrically powered heating device that is controlled based on a target discharge air temperature, an actual discharge air temperature, and an amount of power available;
conditioning a passenger cabin of the electrified vehicle using the airflow heated by the engine and the electrically powered heating device; and
running the electrically powered heating device during a warm-up period of the engine to increase a load on the engine during the warm-up period, accelerate warm-up of the engine, and increase efficiency of the engine.

18. The method as recited in claim 11, comprising reducing a target engine coolant temperature by employing a heater core coolant temperature target offset to reduce coolant heating requirements on the engine and reduce operation of the engine required to heat the coolant.

19. An electrified vehicle, comprising:
a passenger cabin;
an electrically powered heater configured to heat airflow for conditioning said passenger cabin; and
a controller configured to selectively power said electrically powered heating device using an amount of power available or an amount of power necessary to achieve a target discharge air temperature of airflow entering the passenger cabin, whichever is lower.

* * * * *

UNITED STATES PATENT AND TRADEMARK OFFICE
CERTIFICATE OF CORRECTION

PATENT NO. : 10,124,651 B2
APPLICATION NO. : 15/415015
DATED : November 13, 2018
INVENTOR(S) : Noah Blatchley, Angel Fernando Porras and William Samuel Schwartz Page 1 of 1

It is certified that error appears in the above-identified patent and that said Letters Patent is hereby corrected as shown below:

In the Claims

In Claim 10, Column 9, Line 60; replace "powered is" with --powered heater is--

In Claim 19, Column 10, Line 61-62; replace "electrically powered heating device" with --electrically powered heater--

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*